Feb. 11, 1969    L. H. FULLER    3,426,787
TIRE VALVE ASSEMBLY
Filed March 21, 1967
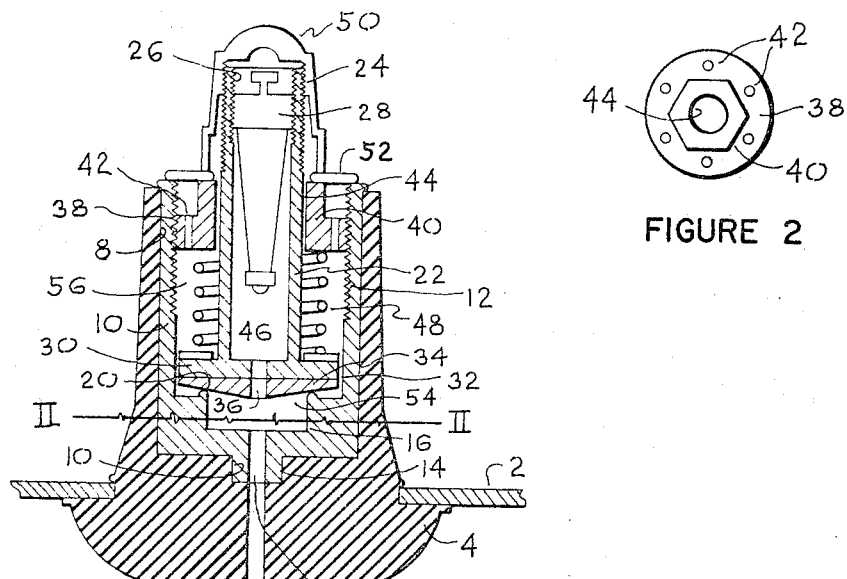
FIGURE 1
FIGURE 2
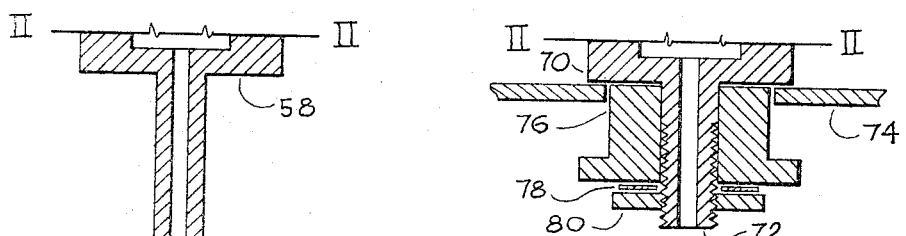
FIGURE 3
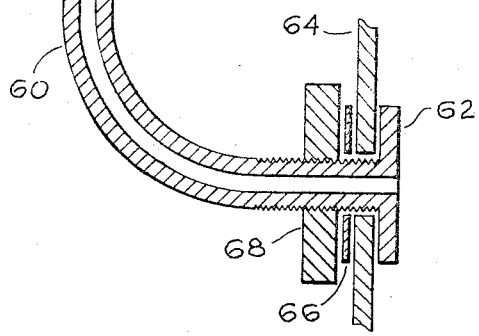
FIGURE 4
INVENTOR
LEONARD H. FULLER.
BY: LeBlanc And Shur.
ATTORNEY.

United States Patent Office 3,426,787
Patented Feb. 11, 1969

3,426,787
TIRE VALVE ASSEMBLY
Leonard H. Fuller, 6011 Drexel Road, Cordova W.,
Pensacola, Fla. 32504
Filed Mar. 21, 1967, Ser. No. 624,818
U.S. Cl. 137—226                        10 Claims
Int. Cl. F16k 15/20, 17/168, 11/04

ABSTRACT OF THE DISCLOSURE

A valve for preventing blowouts due to excess tire pressure utilizing a conventional tire inflation stem and check valve arranged for sliding movement in a cylinder having a valve seat at its lower end engageable with a valve member at the lower end of the stem. The cylinder carries substantially completely therewithin an adjustment plug screw-threadedly engaged with the inner surface of the cylinder and compressing a coil spring which seats the valve member against the valve seat. Porting is around the valve member and through ports in the adjustment plug to provide for release of air at a greater rate than normal tire inflation to cope with the almost instantaneous type of pressure buildup encountered with aircraft landings.

Background of the invention

It is common knowledge that blowouts in the tires of a variety of vehicles constitute a serious problem and cause widespread damage, economic loss, personal injury and death. The most common causes of such blowouts are normally associated with excessive tire pressure which may be caused by overheating from normal usage, by sudden compression of the air upon striking an obstruction in the road, by landing an aircraft at too steep an angle, or by over-inflation. These problems exist whether the tire is mounted on an automobile, airplane, bicycle, motor bike, motorcycle, or truck. The danger is obviously most serious where large numbers of passengers are involved, as in aircraft. Aircraft tire blowouts predominantly occur on landing when the pressure in the tire is almost instantaneously increased upon contact with the ground, generally due to an improper approach. It has been reported that, on the average, approximately one blowout per day occurs on commercial planes in the United States.

The problem of blowouts has long been recognized and efforts to alleviate or eliminate it have been long standing, intensive, and have included a variety of approaches. Possibly the most common approach constitutes attempts to provide one or another type of pressure relief valve intended to determine the maximum pressure that may exist within the tire and thereby prevent excessive tire pressure. Generally speaking, prior attempts at accomplishing this have not been successful for a variety of reasons. In some instances, construction has been complex, expensive, and has entailed a perfection of machining and fabrication which cannot be maintained under the conditions which the particular tires, such as automobile tires, operate. In other instances, the devices have been subject to easy misadjustment or have been so constructed as to make maladjustment almost inevitable. In still other arrangements, the relief device has not permitted air to be discharged at a sufficiently rapid rate to handle the exigencies which do arise.

Summary of the invention

According to the present invention, there is provided a novel and unique tire valve arrangement which is relatively simple in construction, low in cost and adapted to use with both tubes and tubeless tires of all types. The unit is possessed of a pressure adjustment which is at the same time inherently tamperproof and yet easily set with readily available tools. The unit preferably incorporates a standard tire valve so as to minimize both initial and replacement costs and to render the device adaptable to present inflation devices and gages.

The unit of the invention involves a standard tire valve stem containing a standard tire inflation valve. However, the stem has at its lower end a disc-shaped portion carrying a seating washer. The disc-shaped portion is apertured at its center to permit passage of air to the standard inflation valve and the member is received in a cylindrical chamber larger than the valve stem with the washer seating on a valve seat at the bottom of the larger cylindrical chamber. The lower portion of the valve seat is in communication with the interior of the tire. The larger cylindrical chamber is internally threaded and receives a disc-shaped member which compresses a coil spring which forces the washer into engagement with the valve seat at a pressure determined by the normal pressure characteristic of the spring and the positioning of the disc-shaped member. The disc-shaped member carries a series of apertures providing for the escape of air when the relief valve opens to release air from the tire into the larger cylindrical chamber. The total cross sectional area of the apertures in the disc-shaped member is preferably substantially greater than the vent cross section of the standard inflation valve whereby deflation may occur at a rate many times that of inflation in order to handle such emergencies as the almost instantaneous buildup of tire pressure which occurs on the landing of an aircraft. In this respect, the valve is to be contrasted with so-called tire pop valves which have been proposed in the past for the purpose of preventing inadvertent tire overinflation. In such instances, it is adequate if the rate of deflation merely equal that of inflation. The device of the instant invention, in addition to the foregoing, entails a cap and seal arrangement preventing the entry of dirt or other foreign substances into the deflation valving arrangement.

It is accordingly a primary object of the present invention to provide a safety device for all type tires for preventing blowouts by an automatic release of pressure.

It is a further object of the invention to provide a blowout preventing device for use with all types of tires through an automatic release of pressure at a rate which may greatly exceed the normal inflation rate.

It is another object of the invention to provide a device of the foregoing type which is simple, foolproof in adjustment, economical and substantially maintenance free.

It is yet another object of the invention to provide a device of the foregoing type which minimizes the possibility of inadvertent misadjustment.

It is another object of the invention to provide a device of the foregoing type which is capable of utilizing standard tire inflation stems and valves so as to be adapted to existing inflation and gaging devices.

These and further objects and advantages of the invention will become more apparent upon reference to the following specification and claims and appended drawings wherein:

Brief description of the drawing figures

FIGURE 1 is a vertical cross section showing one embodiment of a device constructed according to the present invention;

FIGURE 2 is a top plan view of the relief pressure setting disc;

FIGURE 3 is a partial sectional view showing another embodiment of an arrangement for connecting the device of the invention to a tube or rim; and FIGURE 4 is a partial cross sectional view showing still another embodiment of a still different method of connecting the device of the invention to a tube or rim.

*Description of the preferred embodiment*

Referring to the figures of the drawing, and more particularly to FIGURE 1, there is seen a conventional tire rim 2 having mounted therein a more or less conventional vulcanized rubber plug 4. The plug 4 carries a central axial inflation and deflation opening 6 connected with a large bore 8 and small counterbore 10. Mounted within the bore 8 is a metal cylinder 10 which is internally threaded at 12 and which has a nipple 14 snugly received within the counterbore 10. The cylinder 10 and plug 4 engage one another in airtight relationship. The cylinder 10 is counterbored at 16 and axially apertured at 18. The upper peripheral edge of the counterbore 16 carries a valve seat lip 20 thereabout.

Mounted within the cylinder 10 is a standard diameter valve stem 22 having the usual external thread 24 and internal thread 26. The internal thread 26 receives a standard tire valve unit 28 in conventional fashion.

The bottom of the stem 22 carries a disc-like skirt or flange 30 having a depending peripheral lip 32 which receives a valve seat washer 34. The washer 34 and disc 30 are apertured at 36 for inflation of the tire. The diameter of the disc 30 is such as to provide a loose sliding fit with the interior surface of the cylinder 10.

Within the top of the cylinder 10 and engaged with the interior thread 12 is a release adjustment disc 38 having an upstanding hexagonal nut extension 40 and a series of discharge ports 42. The disc 38 is bored at 44 to slidably receive the stem 22.

According to the invention, the total cross sectional area of the ports 42 are preferably considerably in excess of the total cross sectional area of the opening 36 so as to permit air discharge at a rate which considerably exceeds the normal inflation rate. It will be obvious that the clearance between the disc 30 and internal surface of cylinder 10 must be sufficiently great to allow passage of the air at the same rate as it may escape through the ports 42. It will also be obvious that the clearance between the stem 22 and the bore 44 in disc 38 is not critical and does not constitute a portion of the air seal whereby precision machining at this point is obviated. As an alternative to the loose sliding fit between disc 30 and cylinder 10, it is also possible to use a closer fit in conjunction with ports through the disc 30 and washer 34 outside of peripheral lip 20. However, the illustrated arrangement is preferred because of the lack of criticality in fit which is thus attained.

Mounted between the disc 38 and a washer 46 on top of the disc 30 is a coil spring 48 whose tension is dependent upon the position of the disc 38. This may be adjusted through the use of a standard hexagonal wrench on the hexagonal nut protrusion 40 of disc 38. It is this adjustment which determines the relief pressure setting. It will be noted that the adjustment may be made with facility through the use of an ordinary hexagonal wrench (or even a pair of pliers) and yet there is no protruding portion of the valve which might accidentally be moved by hand and thereby create a maladjustment.

The upper end of the stem 22 receives a standard threaded cap 50 having a large skirt 52 which forms an O-ring seal for the upper open end of the cylinder 10, thereby preventing the ingress of dirt or foreign matter which might either interfere with the sliding motion of the stem 22 or tend to clog or otherwise obstruct the escape ports 42. Further, the use of such a cap provides the service station attendant or other tire inflater with a thoroughly conventional arrangement such that there is no need to educate such personnel as to any change in operation of the tires. This is an important feature inasmuch as it is practically impossible to insure that all service station attendants could or would promptly become instructed in the use of any unit requiring a significantly different approach to tire inflation.

The operation of the embodiment of the invention as shown in FIGURES 1 and 2 is as follows:

The tire is inflated in the standard manner by removing the cap 50 and inflating through the conventional valve 28, stem 22, opening 36, chamber 54, opening 18 and opening 6. During this time, the washer 34 is forced into airtight engagement with the lip 20 in cylinder 10 by spring 48. The cap 50 is then replaced and the unit is ready for service. The exact pressure at which relief will occur is determined by the degree to which the disc 38 is advanced into the cylinder 10 to compress the spring 48 and this may be adjusted in a variety of fashions. For example, utilizing a standard service station tire pressure gage, the tire may be deliberately overinflated to the point at which it is desired that relief occur and the disc 38 may then be backed out of the cylinder 10 until the washer 34 just unseats to allow relief. Alternatively, the conventional service station air pump with the bell-ringing type pressure adjustment arrangement may be used to inflate the tire to the desired overinflated pressure and the same adjustment procedure followed. It is also obvious that it is possible to provide suitable indicia on the internal surface of the cylinder 10 and on the disc 38 which would indicate the pressure setting.

With the unit now set and the cap 50 replaced, the tire is ready for service. Upon the occurrence of an internal tire pressure exceeding the preset relief pressure, the entire stem unit 22 is forced upwardly against the pressure of spring 48, thereby moving the washer 34, disc 30, stem 22, valve 28 and cap 50 as a unit. Air then rapidly escapes around the periphery of lip 20 and disc 30, through space 56 in cylinder 10, ports 42 and disc 38 and past the opening formed between skirt 52 and the upper edge of cylinder 10. As previously stated, the device of the invention is such that air release may occur at a rate far in excess of the normal rate of tire inflation, whereby extremely rapid pressure buildup, such as in aircraft landing, may be prevented from causing a blowout.

Referring now to FIGURE 4, there is shown an alternative means for mounting the unit of the invention to a tube or tire. Referring to that figure, there is shown at the upper left portion thereof, the lowermost end 58 of the cylinder unit of FIGURE 1 which has been cut along the line II—II of FIGURE 1. Depending from that cylinder is a tube 60 which itself terminates in a flanged end 62 mounted interiorly of a tube or rim 64. A friction ring 66 and nut 68 complete the airtight assembly of the flange 62 to the tube or rim 64. In this manner, the unit of the invention may be mounted at varying distances from the tire in varying positions.

Referring to FIGURE 3, there is shown still another arrangement for mounting the unit of the invention to a tube or tire rim. Here again, there is shown at 70 the lower portion of the cylinder 10 cut along the line II—II of FIGURE 1. The cylinder is provided with an elongated and threaded stem 72. The cylinder 70 is sealed to the rim 74 by means of a washer 76, friction ring 78 and nut 80.

It will be apparent from the foregoing that there is here provided a novel and unique device for preventing blowouts in tires of all sorts. The unit is simple in construction, tamperproof, economical and so constructed that the average tire inflater, such as service station attendants, need not even be advised that the tire is equipped with the new unit. The device is so constructed as to require practically no maintenance and provides for release of excess tire pressure at a rate greatly eyceeding the normal inflation rate to thereby adapt it to a much wider variety of uses than would be the case if the converse were true.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefor intended to be embraced therein.

What is claimed and desired to be secured by United States Letters Patent is:

1. A valve assembly for a tire comprising a cylindrical member having an open end, closure means in the other end of said cylindrical member having an opening therein adapted for communication with the interior of a tire and having a valve seat about said opening, a valve member slidably mounted in said cylindrical member and carrying a hollow tubular stem of lesser diameter extending out of the open end of said cylindrical member and having both external and internal threads, a conventional tire inflation check valve screw threadedly mounted within said stem, an opening in said valve means communicating between said stem and the other side of said valve means, a disc member screw threadedly engaged with the interior of said cylindrical member and mounted substantially completely therewithin about said stem, port means in said disc member, tool engaging means on the outer end of said disc member for turning said member in the threads in said cylindrical member, spring means compressed between said valve member and said disc member whereby rotation of said disc member in said cylindrical member varies the compression of said spring means and thereby the tire pressure which will cause said valve member and stem to move and permit relief of said tire pressure, and cap means screw threadedly engaging said tubular stem and having a portion thereof sealing the open end of said cylindrical member.

2. A valve assembly as set out in claim 1 wherein said port means are so arranged as to permit air passage therethrough at a greater rate than that at which said tire is normally inflated.

3. A valve assembly as set out in claim 1 wherein said closure means comprises a circular wall having an axial bore with said opening having a diameter substantially smaller than said bore and extending axially from said bore, a lip upstanding from the peripheral edge of said bore, said valve member having a depending skirt and a washer mounted therein for engaging said lip in airtight engagement under the pressure of said spring, said valve member extending beyond said lip and having a loose slide fit relationship with the inner wall of said cylindrical member.

4. A valve assembly as set out in claim 1 wherein said disc member slidingly receives said stem and has an axial protrusion also slidingly receiving said stem to provide guidance for its axial movement, said protrusion being so shaped as to constitute said tool engaging means.

5. A valve assembly as set out in claim 1 wherein said port means are so arranged as to permit air passage therethrough at a greater rate than that at which said tire is normally inflated, and wherein said closure means comprises a circular wall having an axial bore with said opening having a diameter substantially smaller than said bore and extending axially from said bore, a lip upstanding from the peripheral edge of said bore, said valve member having a depending skirt and a washer mounted therein for engaging said lip in airtight engagement under the pressure of said spring, said valve member extending beyond said lip and having a loose slide fit relationship with the inner wall of said cylindrical member, said disc member being arranged so that it slidingly receives said stem and has an axial protrusion also slidingly receiving said stem to provide guidance for its axial movement, said protrusion being so shaped as to constitute said tool engaging means.

6. A valve assembly as set out in claim 5 wherein said cap includes a skirt which engages the open end of said cylindrical member and said spring means comprises a coil spring.

7. A valve assembly as set out in claim 1 wherein said cylindrical member comprises a cylindrical body having one open end and the other end closed by a wall having a central axial thickness less than its peripheral axial thickness to define a bore having an axial opening smaller than said bore communicating therewith, an upstanding lip around the periphery of said bore, said valve member being disc shaped and of a diameter greater than the diameter of said bore and slightly less than the inside diameter of said cylindrical body within which it is slidably received, a central axial aperture in said valve member, said aperture being of a diameter substantially less than that of said bore, a depending skirt on said valve member carrying a valve washer engaging said lip, and said stem having an inside diameter less than the diameter of said central axial aperture.

8. A valve assembly as set out in claim 1 wherein said opening in said valve means comprises an axial aperture of a diameter less than the internal diameter of said stem.

9. A valve assembly as set out in claim 1 wherein said valve member is disc shaped and of a diameter greater than said valve seat and slightly less than the internal diameter of said cylindrical member whereby an air passage is formed around said valve member which at the same time serves a support and guide function for said valve member and stem assemblage in said cylindrical member.

10. A valve assembly as set out in claim 9 wherein said air passage and said port means are so arranged as to permit air passage therethrough at a greater rate than that at which said tire is normally inflated.

References Cited

UNITED STATES PATENTS

| | | | |
|---|---|---|---|
| 1,064,526 | 6/1913 | Noe | 137—226 |
| 1,216,919 | 2/1917 | Ashelman | 137—226 |
| 1,229,885 | 6/1917 | Chadwick | 137—493.6 XR |

HAROLD W. WEAKLEY, Primary Examiner.

U.S. Cl. X.R.

137—232, 377, 493.1, 493.6